(12) United States Patent
Crawford

(10) Patent No.: US 7,991,663 B1
(45) Date of Patent: Aug. 2, 2011

(54) SYSTEM FOR VOLUME AND STRESS TESTING BANK DEBIT CARD PROCESSING SYSTEMS

(75) Inventor: Robert Craig Crawford, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 171 days.

(21) Appl. No.: 11/925,581

(22) Filed: Oct. 26, 2007

(51) Int. Cl.
G06Q 40/10 (2006.01)
(52) U.S. Cl. ........................................ 705/35; 705/36 R
(58) Field of Classification Search .................... 705/35, 705/36 R
See application file for complete search history.

(56) References Cited

U.S. PATENT DOCUMENTS

| | | | |
|---|---|---|---|
| 5,920,848 | A | 7/1999 | Schutzer et al. |
| 6,859,758 | B1 | 2/2005 | Prabhakaran et al. |
| 6,950,830 | B2 | 9/2005 | Obradovic et al. |
| 7,403,954 | B2 | 7/2008 | Bornhoevd et al. |
| 7,519,527 | B2 | 4/2009 | Lau et al. |
| 2002/0184528 | A1* | 12/2002 | Shevenell et al. ............. 713/201 |
| 2003/0088579 | A1 | 5/2003 | Brown et al. |

OTHER PUBLICATIONS

No author, Kings College London—Novel Approaches to Intrusion and Fraud Detection, www.kcl.ac.uk/schools/pse/dcs/services/compimmunology.html.*

"Stress Testing," *WebPartner*, http://www.webpartner.com/products/st_main.html, downloaded 2007, 7 pages.
"TPNS web server testing," *IBM*, http://www-1.ibm.com/support/docview.wss?rs=2380&context=SSHJ26&dc=D400&uid=swg24000276&loc=en_US&cs=UTF-8&lang=en&rss=ct2380other, downloaded 2007, 1 page.
"TPNS V3R5 Script Generating Utilities," *IBM Corp.*, http://publibfp.boulder.ibm.com/cgi-bin/bookmgr/BOOKS/itpsu001/CCONTENTS, downloaded 2007, 5 pages.
"TPNS V3R5 Creating TPNS Message Generation Decks," *IBM Corp.*, http://publibfp.boulder.ibm.com/cgi-bin/bookmgr/BOOKS/itpmd001/CCONTENTS, downloaded 2007, 5 pages.
"TPNS V3R5 General Information," *IBM Corp.*, http://publibfp.boulder.ibm.com/cgi-bin/bookmgr/BOOKS/itpgi001/CONTENTS?SHELF=&DT=19961023010410#CONTENTS, downloaded 2007, 2 pages.

* cited by examiner

*Primary Examiner* — Kirsten S Apple
*Assistant Examiner* — Abdul Basit
(74) *Attorney, Agent, or Firm* — Brooks, Cameron & Huebsch, PLLC

(57) ABSTRACT

Methods, systems, and computer-readable media are disclosed for volume and stress testing bank/credit processing systems. In one implementation, the example system can be configured to include at least one subsystem configured to generate a plurality of data packages. In this example each data package of the plurality can include one of a plurality of simulated financial transactions. The example system can be configured to include at least one subsystem configured to transmit the plurality of data packages to a target database operable to perform at least one of the simulated financial transactions included in one of the plurality of data packages. In this example, the example system can also be configured to include at least one subsystem configured to monitor performance characteristics of the target database as it processes the plurality of data packages.

21 Claims, 14 Drawing Sheets

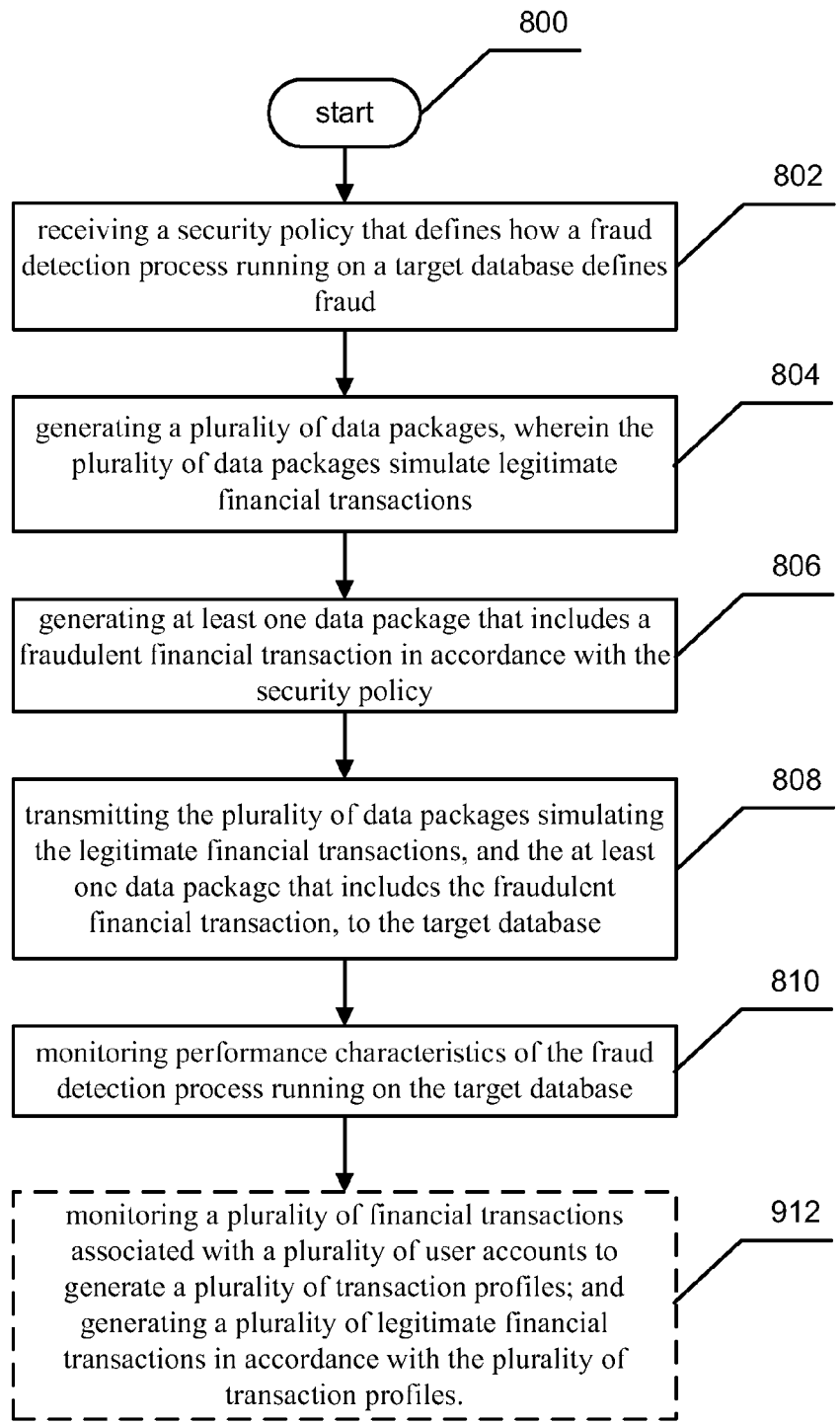

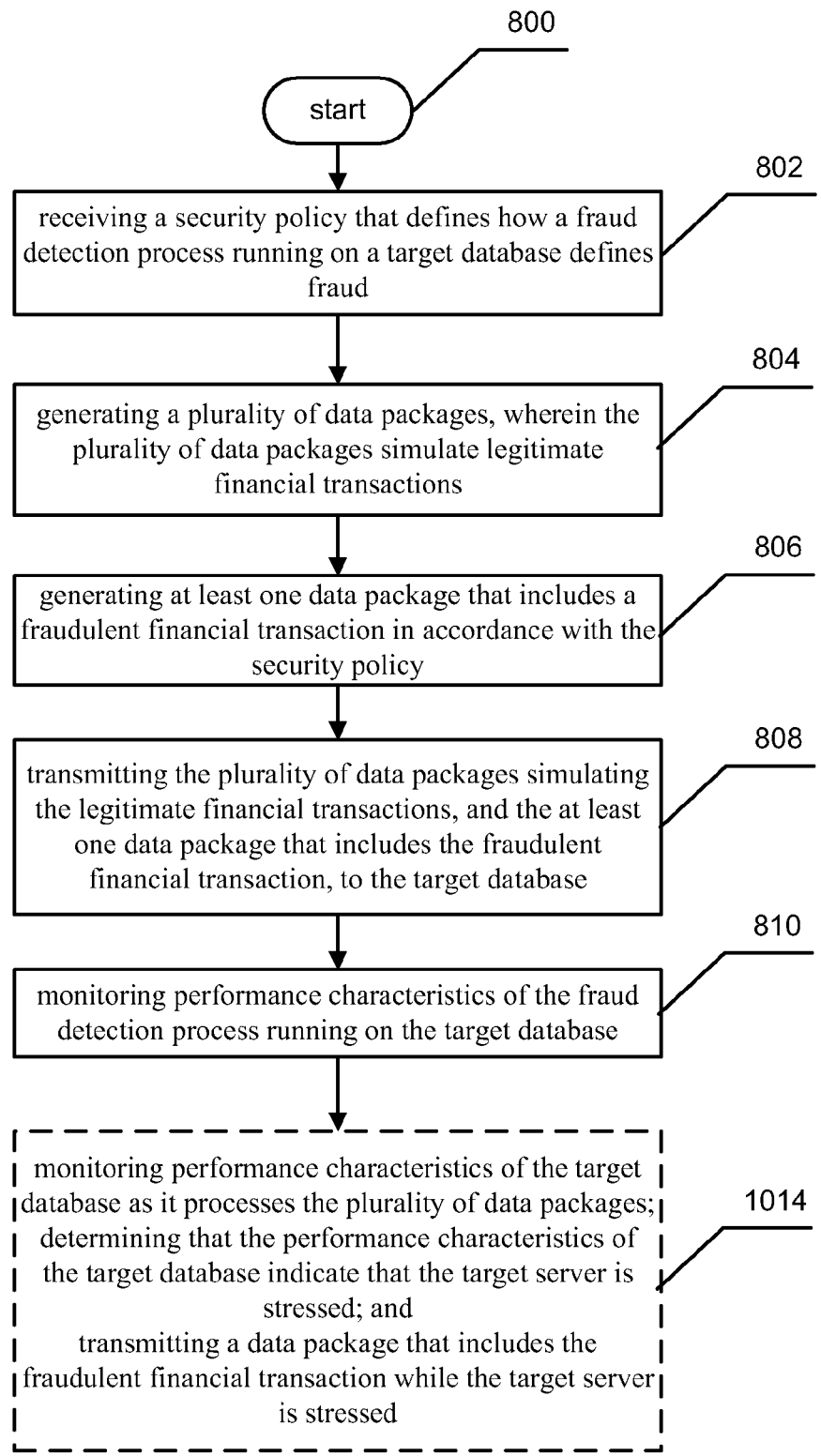

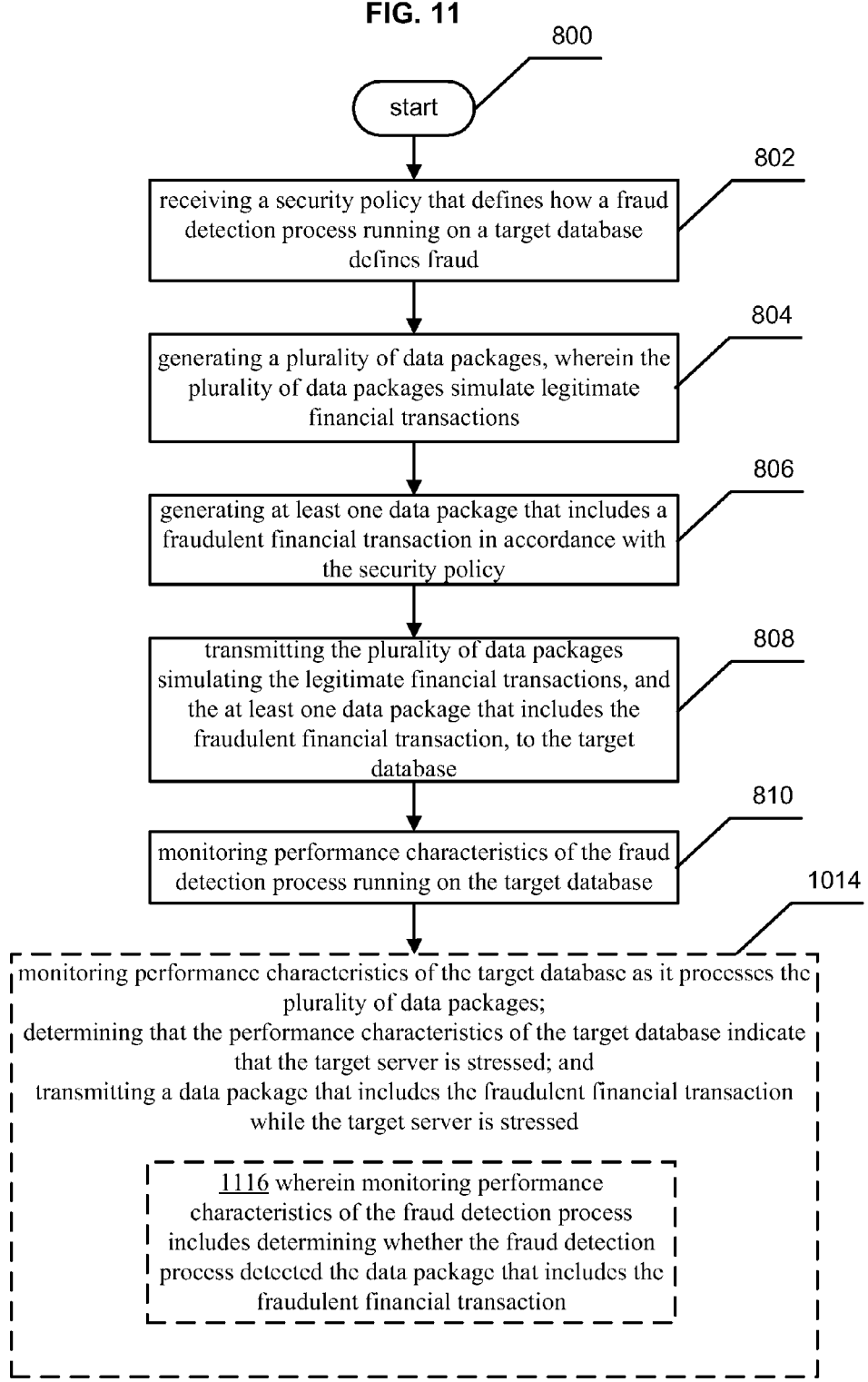

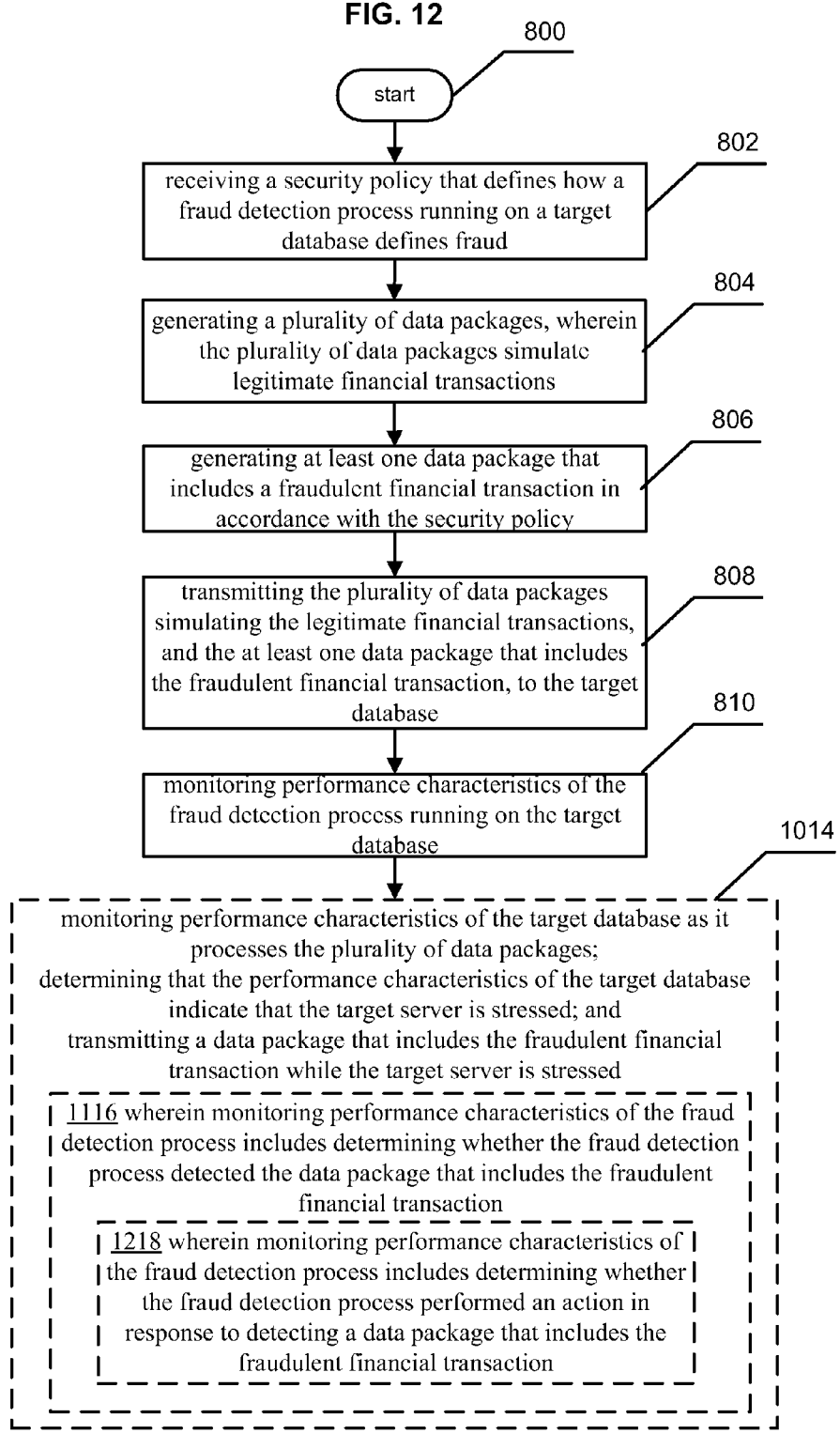

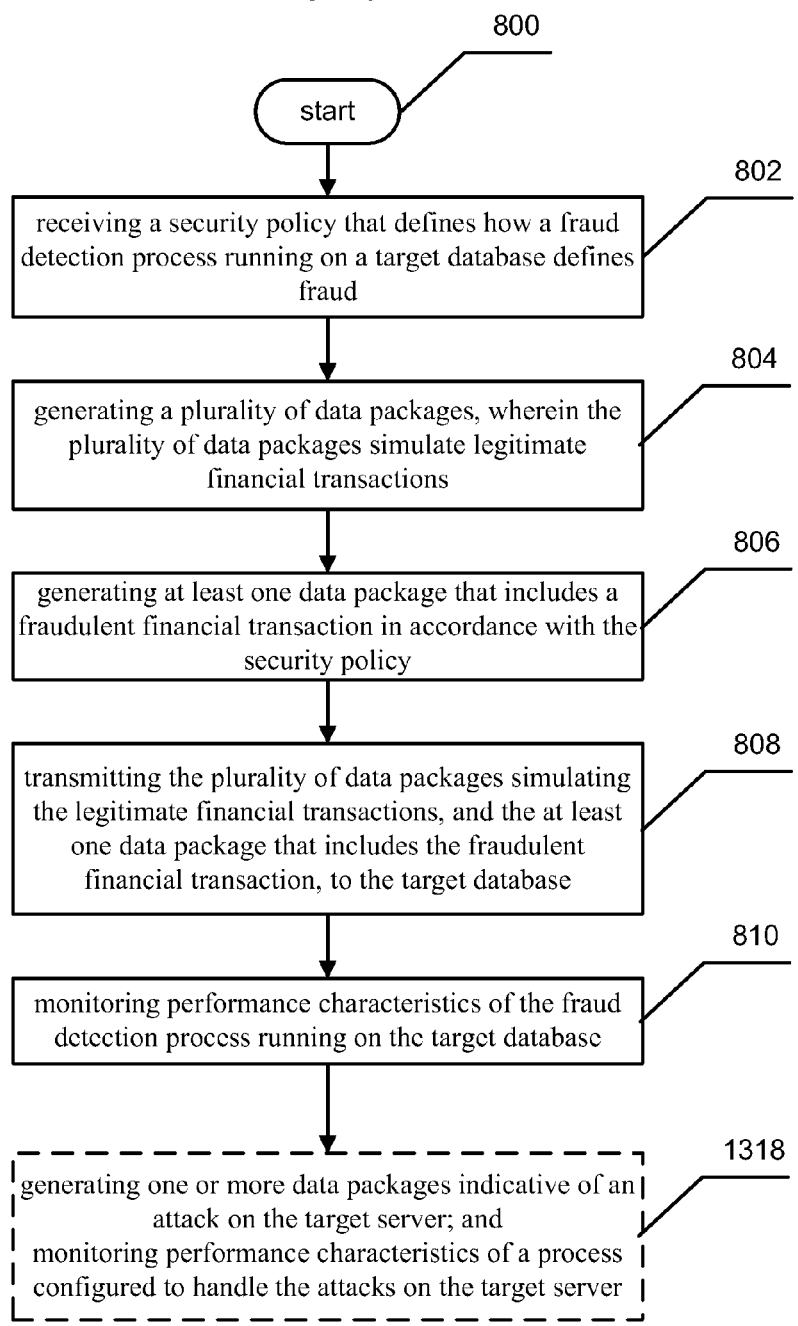

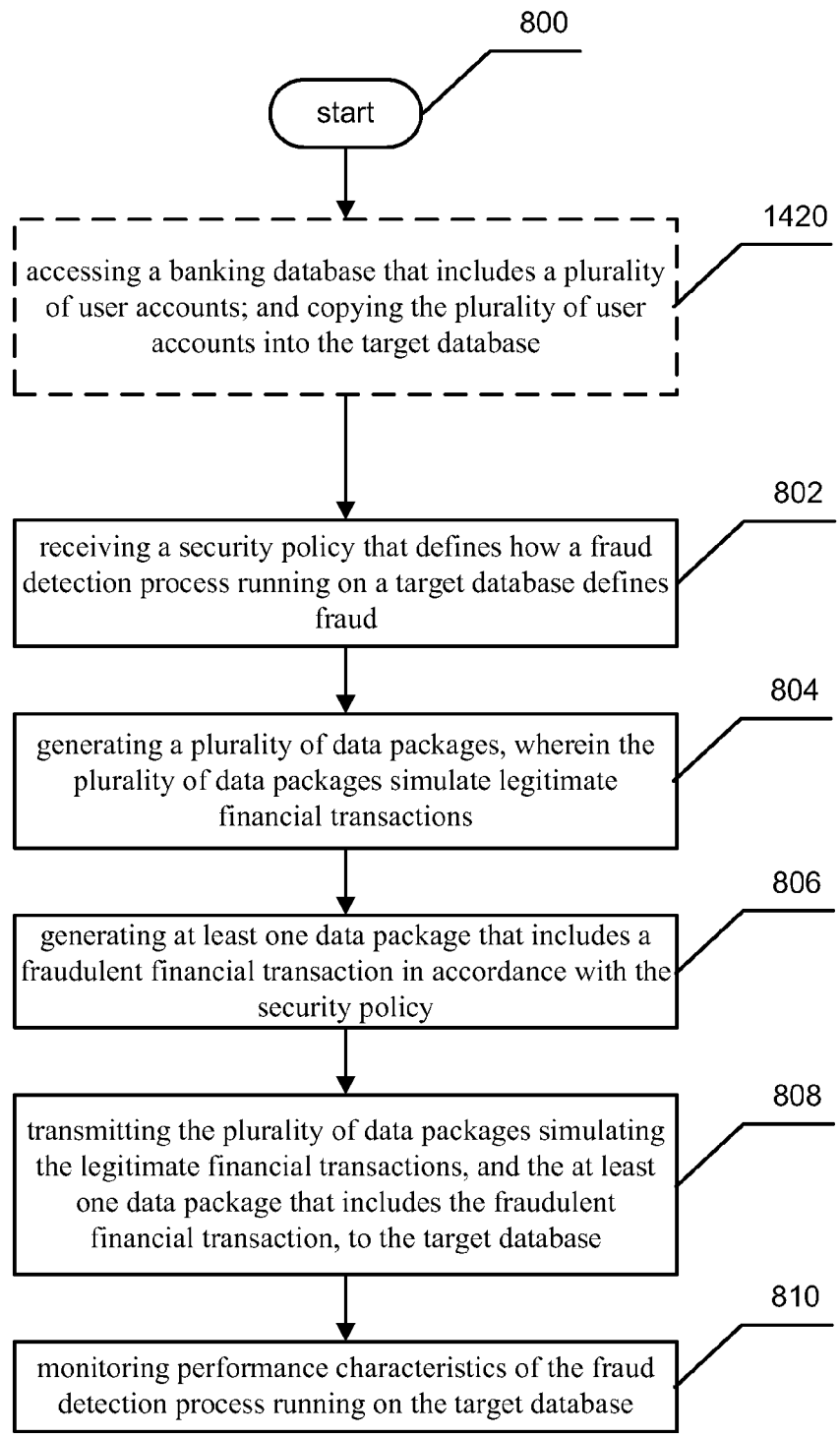

SYSTEM FOR VOLUME AND STRESS TESTING BANK DEBIT CARD PROCESSING SYSTEMS

CROSS-REFERENCE TO RELATED SUBJECT MATTER

This application is related to subject matter disclosed in U.S. patent application Ser. No. 11/925,574, filed Oct. 26, 2007, entitled "System for Volume and Stress Testing Bank Debit Card Processing Systems." The contents of the above referenced U.S. patent application is herein incorporated by reference in its entirety.

BACKGROUND

Consumers, and businesses alike take for granted that transaction processing systems, such as a system that handles credit card, or debit card transactions will work. However this system is extremely complex. If a piece of equipment, either software or hardware, were to fail, become unstable, or crash, it could be disastrous. Because of the consequences associated with a failure in the system, financial service providers are hesitant to implement new features, services, or even migrate software from one server to another without knowing that the system will not fail. Not only are some administrators worried that their transaction processing systems may fail, but they are worried that any changes to their existing setup could adversely affect background processes running supporting the transaction processing system such as processes configured to detect fraud or protect the server from hackers. If a system administrator implements a new service, they want to know that the server will be able to process financial transactions, and implement any services that support the financial transaction processing system.

SUMMARY

An example embodiment provides a method and in some instances, the method includes, but is not limited to monitoring a plurality of financial transactions associated with a plurality of user accounts to generate a plurality of transaction profiles; generating a plurality of simulated financial transactions for a first user account of the plurality in accordance with a transaction profile associated with the first user account; generating a plurality of data packages, wherein each data package of the plurality includes one of the plurality of simulated financial transactions; transmitting the plurality of data packages to a target database operable to perform at least one of the simulated financial transactions included in one of the plurality of data packages; and monitoring performance characteristics of the target database as it processes the plurality of data packages. In addition to the foregoing, other method aspects are described in the claims, drawings, and text forming a part of the present disclosure.

It can be appreciated by one of skill in the art that one or more various method aspects of the disclosure may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer.

Another example embodiment provides a method, in some instances, the method includes, but is not limited to, receiving a security policy that defines how a fraud detection process running on a target database defines fraud; generating a plurality of data packages, wherein the plurality of data packages simulate legitimate financial transactions; generating at least one data package that includes a fraudulent financial transaction in accordance with the security policy; transmitting the plurality of data packages simulating the legitimate financial transactions, and the at least one data package that includes the fraudulent financial transaction, to the target database; and monitoring performance characteristics of the fraud detection process running on the target database. In addition to the foregoing, other method aspects are described in the claims, drawings, and text forming a part of the present disclosure.

It can be appreciated by one of skill in the art that one or more various method aspects of the disclosure may include, but are not limited to, circuitry and/or programming for effecting the herein-referenced system aspects; the circuitry and/or programming can be virtually any combination of hardware, software, and/or firmware configured to effect the herein-referenced method aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

FIG. 9 depicts an alternative embodiment of the operational flowchart 800 of FIG. 8 including an additional operation.

FIG. 10 depicts an alternative embodiment of the operational flowchart 800 of FIG. 8 including an additional operation.

FIG. 11 depicts an alternative embodiment of the operational flowchart 800 of FIG. 10 including an additional operation.

FIG. 12 depicts an alternative embodiment of the operational flowchart 800 of FIG. 11 including an additional operation.

FIG. 13 depicts an alternative embodiment of the operational flowchart 800 of FIG. 8 including an additional operation.

FIG. 14 depicts an alternative embodiment of the operational flowchart 800 of FIG. 8 including an additional operation.

DETAILED DESCRIPTION OF ILLUSTRATIVE EMBODIMENTS

Figure 1:
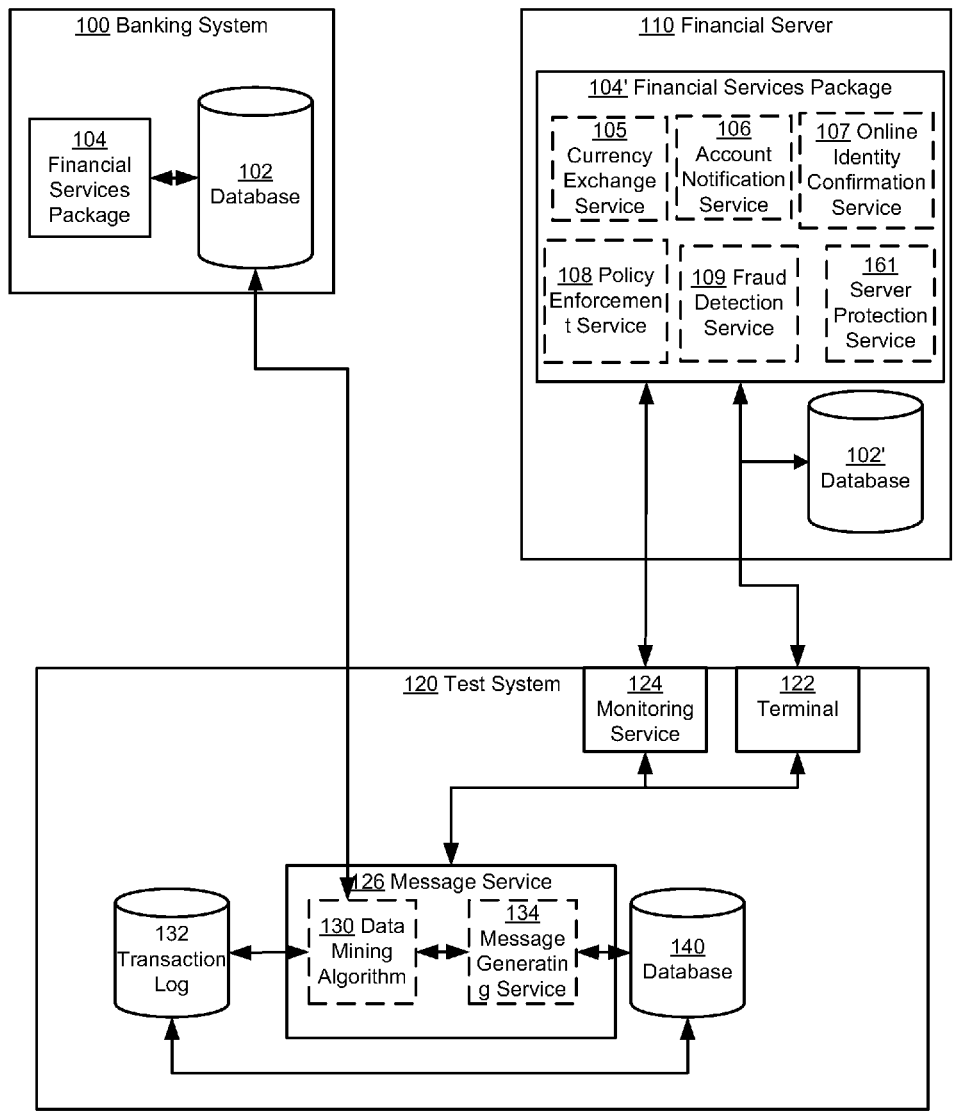
FIG. 1 depicts an example operational environment that can be used to practice aspects of the present disclosure.

Referring now to FIG. 1, it depicts an example operational environment that can be used to practice aspects of the present disclosure. One skilled in the art will note that the example elements depicted in FIG. 1 are provided to illustrate an example operational context for describing the example operational procedures of FIG. 2-13. This example operational environment and will be described in more detail below with respect to how the operational procedures in FIG. 2 through FIG. 13 are effected by the elements depicted in FIG. 1. One skilled in the art will appreciate that the example operational context is to be treated as illustrative only and in no way limit the scope of the claims.

Referring again to FIG. 1, it generally depicts a banking system 100 that includes a database of financial accounts 102. In some example implementations, the banking system 100 can include an actual financial server that maintains banking accounts. In this example, the banking system 100 can be configured to receive financial transaction origination messages indicative of electronic transactions, e.g., one or more packets of information conforming to a standard, indicative of a transaction originating from a debit or credit card point of sale (POS) terminal, or an automatic teller machine (ATM). The messages can be transmitted over a series of networks to the banking system 100 for authorization against an account associated with a user. The banking system 100 can be configured to receive a plurality of messages simultaneously, and these messages can each include information indicative of one of a plurality of financial transactions, e.g., purchases, withdrawals, deposits, refunds, reversals, balance inquires, payments, and inter-account transfers. A financial services package 104 of the banking system 100 can be configured to receive the messages, and invoke procedures, or methods, to modify an account if appropriate. For example, if a message is received that indicates a purchase at a price of $10.00, the financial services package 104 can remove $10.00 from the appropriate account stored in the database 102, and add $10.00 to the appropriate account.

In addition to the banking system 100, FIG. 1 depicts a financial server 110. The financial server 110 of the present disclosure can include similar elements to that of the banking system 100, such as a financial services package 104', and a database of accounts 102'; however the financial server 110 is non-operational, e.g., it is not connected to a transaction processing system and is not accepting messages from POS terminals or ATMs. In this case, the financial server 110 is non-operational because the financial server 110 is one of a newly implemented system, an old system that includes new software and/or hardware, and/or an old system that includes a new service implemented by one or more programs. For example, in some implementations an administrator of the financial server 110 may have recently installed a financial services package 104', and may want to determine whether the physical hardware effecting the financial server 110 can process the anticipated volume of financial transaction messages that will be received when the server goes live. In other embodiments, an administrator may want to know if the financial services package 104' can perform adequately when one or more services are using the resources of the server while the financial services package 104' is processing messages. As shown in FIG. 1, in some embodiments, these services can include, but are not limited to, services 105, 106, 107, 108, 109, and/or 161. As shown in FIG. 1, in some embodiments these services can be part of the financial services package 104', however in other embodiments one or more of services 105, 106, 107, 108, 109, and/or 161 can be operatively coupled to the financial services package 104', running on different servers, e.g., in a distributed system. Services 105, 106, 107, 108, 109, and, 161 are also depicted, and described as separate elements for clarity purposes, however other embodiments exist, and one or more of the services 105, 106, 107, 108, 109, and, 161 can be implemented by the same hardware, software, or firmware. For example, in some embodiments the same software program that implements the fraud detection service 109 can be the same program that implements the currency exchange service 105.

In this example situation, the administrator may want to perform a stress test on the financial server 110 in order to determine whether it can handle processing the anticipated number of messages. Generally, as shown by FIG. 1, the test system 120 of the present disclosure can include at least one terminal 122, a monitoring service 124, and a message service 126 configured to stress the financial server 110. A terminal 122 in some embodiments of the present disclosure can include, but is not limited to, one or more personal computers, or any number of other devices that can connect to a network such as an intranet, or the Internet. In some example embodiments, the terminal 122 can include a program that simulates a large number of devices such as POS terminals or ATMs. The terminal 122 can be configured to transmit a plurality of messages to the financial server 110 in order to simulate the amount of transactions the banking system 100 processes. In some embodiments, and described more fully below, the terminal 122 can transmit messages programmed to emulate actual messages sent by POS terminals or ATMs. In at least one embodiment, the terminal 122 can include the message service 126, i.e., the hardware, software, and/or firmware configured to effect the message service 126 can be part of the terminal 122, or in other embodiments, the message service 126 can be part of another device (not shown), and operatively coupled to the terminal 122.

A monitoring service 124 can be coupled to the financial server 110, and it can be configured to record data indicative of how much stress the server is under. For example, in some embodiments of the present disclosure, the monitoring service 124 can monitor different metrics such as Input/Output transfer rate statistics, processing statistics, i.e., per CPU, per thread, etc., memory utilization statistics, virtual memory, paging and fault statistics, interrupt statistics, file system activity, context switching statistics, network statistics, etc. The data obtained by the monitoring service 124 can be exposed in various formats and be used to plot graphs, etc.

Referring now to FIG. 2 through FIG. 13 in conjunction with FIG. 1, they depict a series of flowcharts that illustrate implementations of operational procedures of the present disclosure. For ease of understanding, the flowcharts are organized such that the initial flowcharts present implementations via an overall "big picture" viewpoint. Those having skill in the art will appreciate that the style of presentation utilized herein (e.g., beginning with a presentation of a flowchart(s) presenting an overall view and thereafter providing additions to and/or further details in subsequent flowchart(s) generally allows for a rapid and easy understanding of the various process implementations. Those skilled in the art will also note that some of the example operational procedures depicted are illustrated by dashed lines that are indicative of the fact that they are considered optional.

Figure 2:
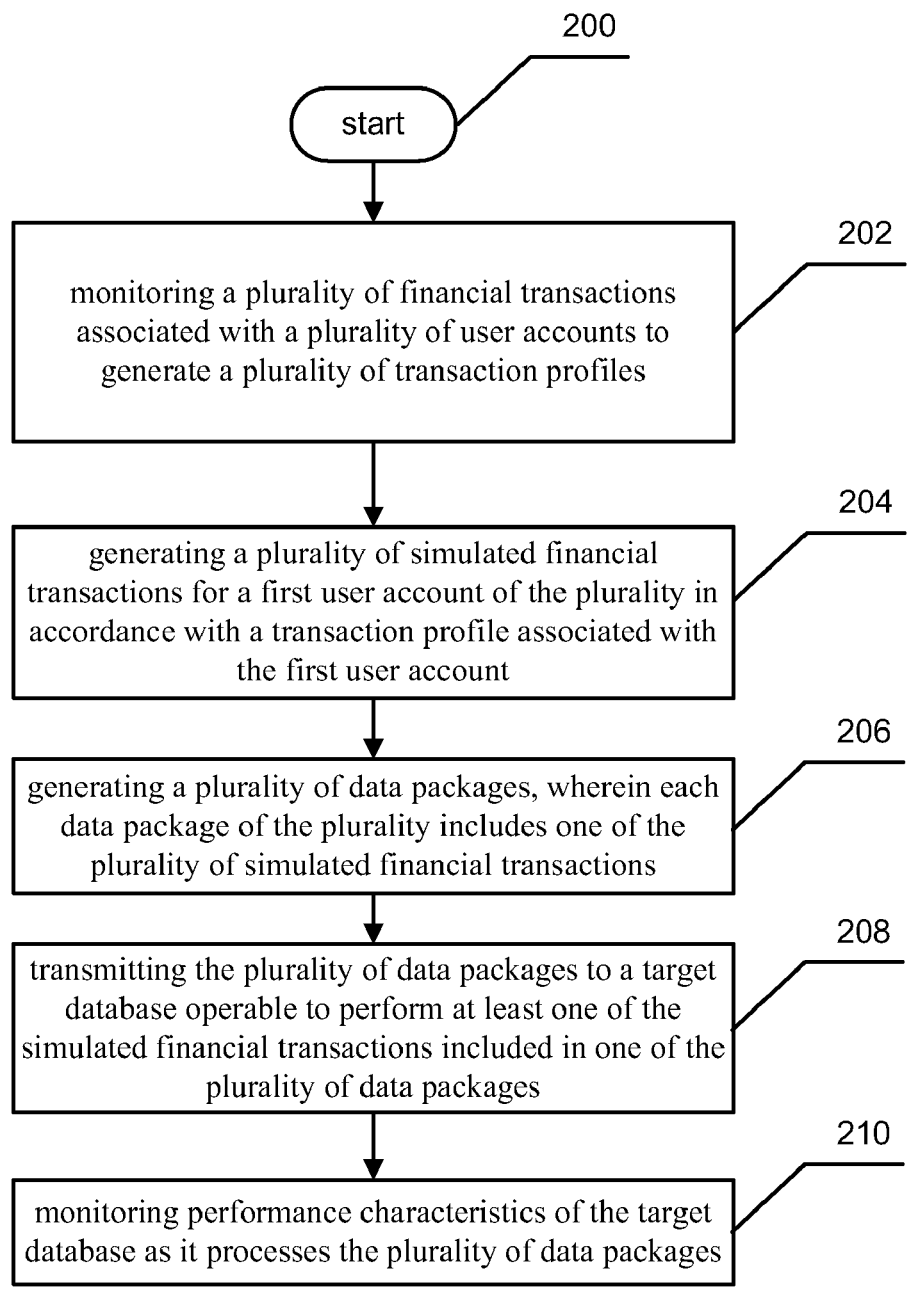
FIG. 2 depicts an example operational flowchart 200 that includes operations directed to stress testing a financial database.

Operational procedure 200 of FIG. 2 begins the operational process, and operation 202 illustrates monitoring a plurality of financial transactions associated with a plurality of user accounts to generate a plurality of transaction profiles. For example, and referring to FIG. 1, a data mining algorithm 130 of a message service 126 can be configured to monitor a plurality of financial transactions occurring on the banking system 100 for a plurality of accounts, and store the transactions in a transaction log 132. The data mining algorithm 130 can subsequently use the information in the transaction log 132 to create a transaction profile for one, some, or all, of the user accounts stored in the database 102. In at least one embodiment, the transaction log 132 could include, for example, a weeks worth of transaction data for a specific user indicative of all the purchases, withdrawals, deposits, refunds, reversals, balance inquires, payments, and/or an inter-account transfers that occurred with respect to this user. The data mining algorithm 130 can process the information and determine how likely it is that a certain transaction will be performed on an account. More specifically, if a person uses their credit card at certain places, and at certain times over the course of a time period, the data mining algorithm 130 can discover this pattern, and use this pattern to create a transaction profile indicative of how, when, and where, the user uses their card. Additionally, the data mining algorithm 130 can in some embodiments process the information in the transaction log 132 for a plurality of accounts to obtain transaction profiles for a plurality of user accounts.

Continuing with the example, operation 204 of FIG. 2 depicts generating a plurality of simulated financial transactions for a first user account of the plurality in accordance with a transaction profile associated with the first user account. For example, once a transaction profile has been created for one, some, or all, of the user accounts stored in database 102, the profiles can be used by a message generating service 134 to generate financial transactions that simulate real world transactions. For example, if a data mining algorithm 130 has processed the transaction log 132, and discovered plurality of patterns for a plurality of users, the message generating service 134 can use the patterns to generate simulated financial transactions for at least one of the plurality of user accounts.

In some example embodiments, this can be effected by a message generating service 134 operating in conjunction with a database such as database 140. For example, database 140 can include a relational database, object oriented database, or a column oriented database, configured to store transaction profiles for users and businesses. For example, the message generating service 134 can be coupled to the database 140, and the message generating service 134 can access the database 140 to obtain one or more transaction profiles.

The message generating service 134 can then use at least one of the transaction profiles to create at least one simulated financial transaction. As described above, a transaction profile can include one or more discovered patterns for each account, e.g., if a user buys lunch at one of 3 places during the work week the profile can reflect this. The message generating service 134 can then access the database 140, to obtain information about the places where the user made purchases to obtain information about the business, e.g., the message generating service 134 can obtain information that identifies what type of business the user made purchases at. One or more procedures can then be invoked by the message generating service 134 to use the information in the transaction profile, in conjunction with the information about the businesses, to create a simulated transaction for one, or a plurality of users.

A specific example may include a transaction profile that indicates that a certain user account is 75% likely to be charged between the hours of 8:00 am-10:45 pm Monday-Friday. Or in other example embodiments, the level of detail can be greater, for example, a certain transaction upon a user account could be 54% likely to be a purchase at a café between the hours of 8:00 am-9:30 am on a Tuesday. The level of detail is proportional to how long the transaction log 132 records transaction information from the banking system 100, and the transaction profiles will be more reflective of real world transactions when there are more data points for the data mining algorithm 132 to process. After the profile is accessed, the message generating service 134 can search for places similar to the places the user made purchases, e.g., similar in type and/or similar in location. The message generating service 134 can then create a transaction that is likely to occur. Thus, in some instances, the message generating service 134 can be configured to create a number of simulated messages for a plurality of user accounts that reflect messages that would be received at the banking system 100 during, for example, a peek processing time. Or in other embodiments, the message generating service 134 can be configured to generate transactions at a rate that exceeds the level of messages received at the peek processing time, up to a multiple where the financial server 110 fails, or the physical limitations of the terminal 122 are met.

Referring again to FIG. 2, operation 206 illustrates generating a plurality of data packages, wherein each data package of the plurality includes one of the plurality of simulated financial transactions. For example, and in addition to the previous example, each one of the generated transactions can include information that identifies a user account and a transaction such as a purchase, a withdrawal, a deposit, a refund, a reversal, a balance inquiry, payments, and/or an inter-account transfer. The message generating service 134 can then generate, e.g., create, using a schema that defines the format that messages use, a plurality of messages that simulate one of the numerous different types of messages that can be sent from a POS terminal or an ATM. In one example embodiment, these messages are indistinguishable from the messages actually generated by POS terminals or ATMs. Each one of the messages created in this specific example, can include an account number, such as a credit card number, or a bank number/routing number of an account stored in the database 102', and, for example, one or more bits that identify a request, e.g., purchase, withdraw, etc., and/or an amount.

Referring again to FIG. 2, it additionally depicts operation 208 that shows transmitting the plurality of data packages to a target database operable to perform at least one of the simulated financial transactions included in one of the plurality of data packages. For example, and in addition to the previous example, once a plurality of data packages indicative of messages has been generated by the message service 126, the terminal 122 can transmit the plurality of data packages to a target database such as the financial server 110.

Referring again to FIG. 2, it additionally depicts operation 210 that shows monitoring performance characteristics of the target database as it processes the plurality of data packages. For example, in some embodiments of the present disclosure, the monitoring service 134 can monitor different metrics such as input/output and transfer rate statistics, processing statistics, i.e., per CPU, per thread, etc., memory utilization statistics, virtual memory, paging and fault statistics, interrupt statistics, file system activity, context switching statistics, network statistics, etc, in order to determine how stressed the financial server 110 is while it is processing messages. For example, the monitoring service 124 can include one or more processes that monitor the metrics, and threshold values can be set such that if a value exceeds the threshold, the system can be considered stressed. In some embodiments of the present disclosure, an administrator experienced with operating environments such as banking system 100 can configure values for the thresholds. In other embodiments, a base line reading of the financial server's metrics can be obtained and used to generate the thresholds. In a specific example, the monitoring service 124 can monitor how long read/write requests take for certain files that are being modified compared to other files. If the transfer time is abnormally high compared to other similar files, or the request is requiring more computer cycles than other processes, then the server could be considered stressed.

Figure 3:
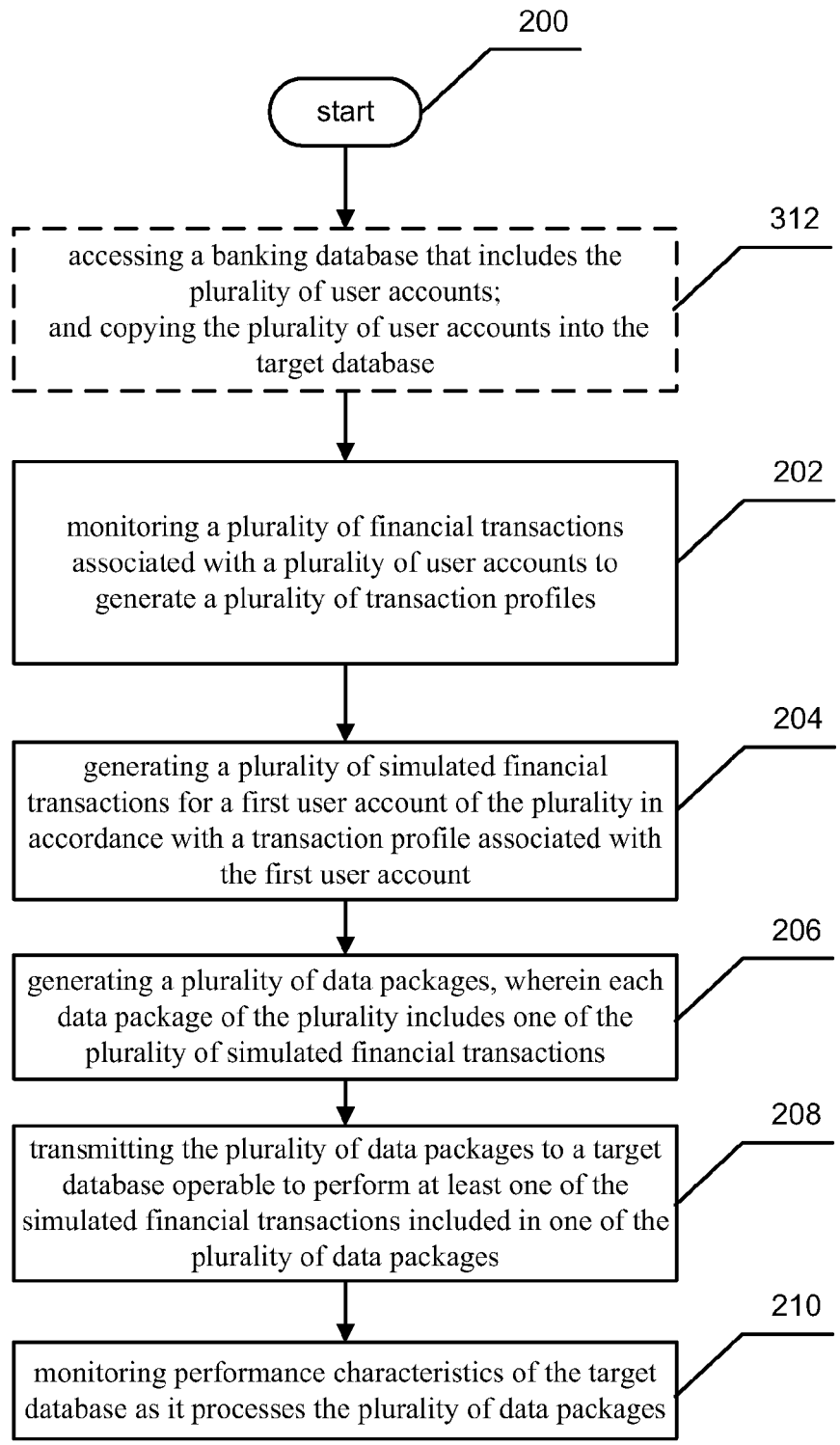
FIG. 3 depicts an alternative embodiment of the operational flowchart 200 of FIG. 2 including an additional operation.

Referring now to FIG. 3, it depicts an alternative embodiment of the operational procedure 200 of FIG. 2 including an additional operation 312 that illustrates accessing a banking database that includes the plurality of user accounts and copying the plurality of user accounts into the target database. For example and referring to FIG. 1, in some example implementations of the present disclosure, a snapshot of the database 102 of the banking system 100 can be taken by the data mining algorithm 132 of the test system 120 at a predetermined time such as once a week, once a month, or when an administrator wants to perform tests on the financial server 110. The snapshot can include the account information, and configuration settings for one or more of the services that are implemented by the banking system 100. The data mining algorithm 132 can then transfer the obtained data over to database 102' so that database 102' is a copy of database 102, and the financial services package 104' configuration parameters are the same as the parameters of financial services package 104.

Figure 4:
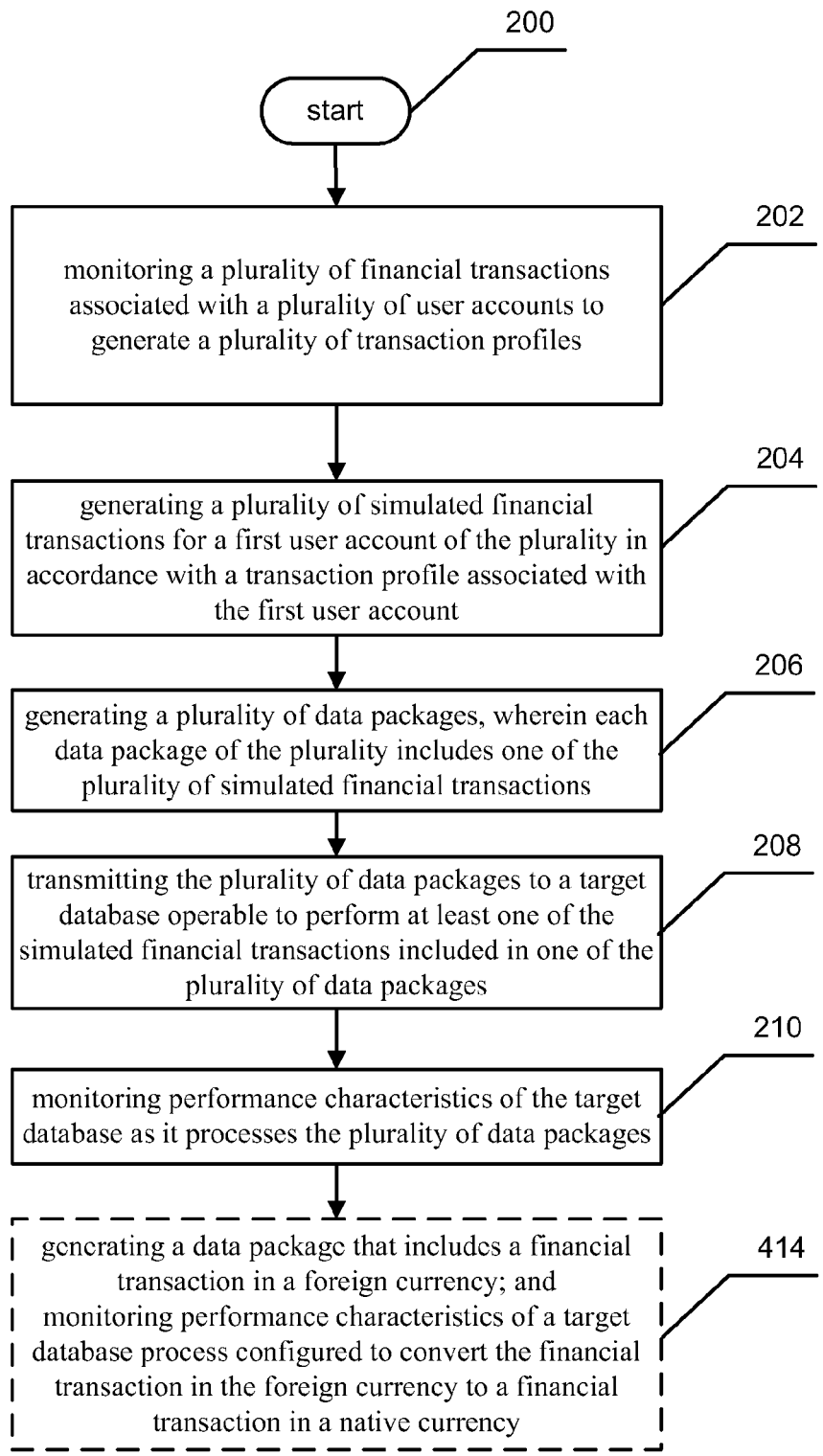
FIG. 4 depicts an alternative embodiment of the operational flowchart 200 of FIG. 2 including an additional operation.

Referring to FIG. 4, it depicts an alternative embodiment of the operational procedure 200 of FIG. 2 including an additional operation 414 that illustrates generating a data package that includes a financial transaction in a foreign currency; and monitoring performance characteristics of a target database process configured to convert the financial transaction in the foreign currency to a financial transaction in a native currency. For example, in some embodiments of the present disclosure, the financial server 110 may implement one or more processes that are configured to support the financial services package 104', and the message generating service 134 can create additional types of data packages that are configured to test how these processes run on the financial server 110 while it is being stressed. In some example embodiments, the financial services package 104' can be coupled to, or include, a service such as an authentication process, ID verification process, etc. In at least one embodiment, the financial server 110 can include a currency exchange service 105 configured to parse messages as they are received by the financial services package 104', and identify whether the transaction is in a foreign currency. When such as message is found, the service 105 can be configured to convert the transaction to the currency the user accounts are in. For example, a method or procedure, can be configured to find messages that include transactions in Euros, and convert them to Dollars before modifying the appropriate accounts in the database 102'. In this example, the message generating service 134 can be configured to generate one transaction, or a plurality of transactions in a foreign currency, and the terminal 122 can be configured to transmit the data package indicative of the message to the financial server 110. The monitoring service 124 can be configured to monitor how the service performs while the financial server is stressed, e.g., the monitoring service 124 can be configured to determine how much processor time the currency exchange service 105 is receiving, and whether it is sufficient to ensure that foreign currency transactions will be properly handled by the financial server 110.

Figure 5:
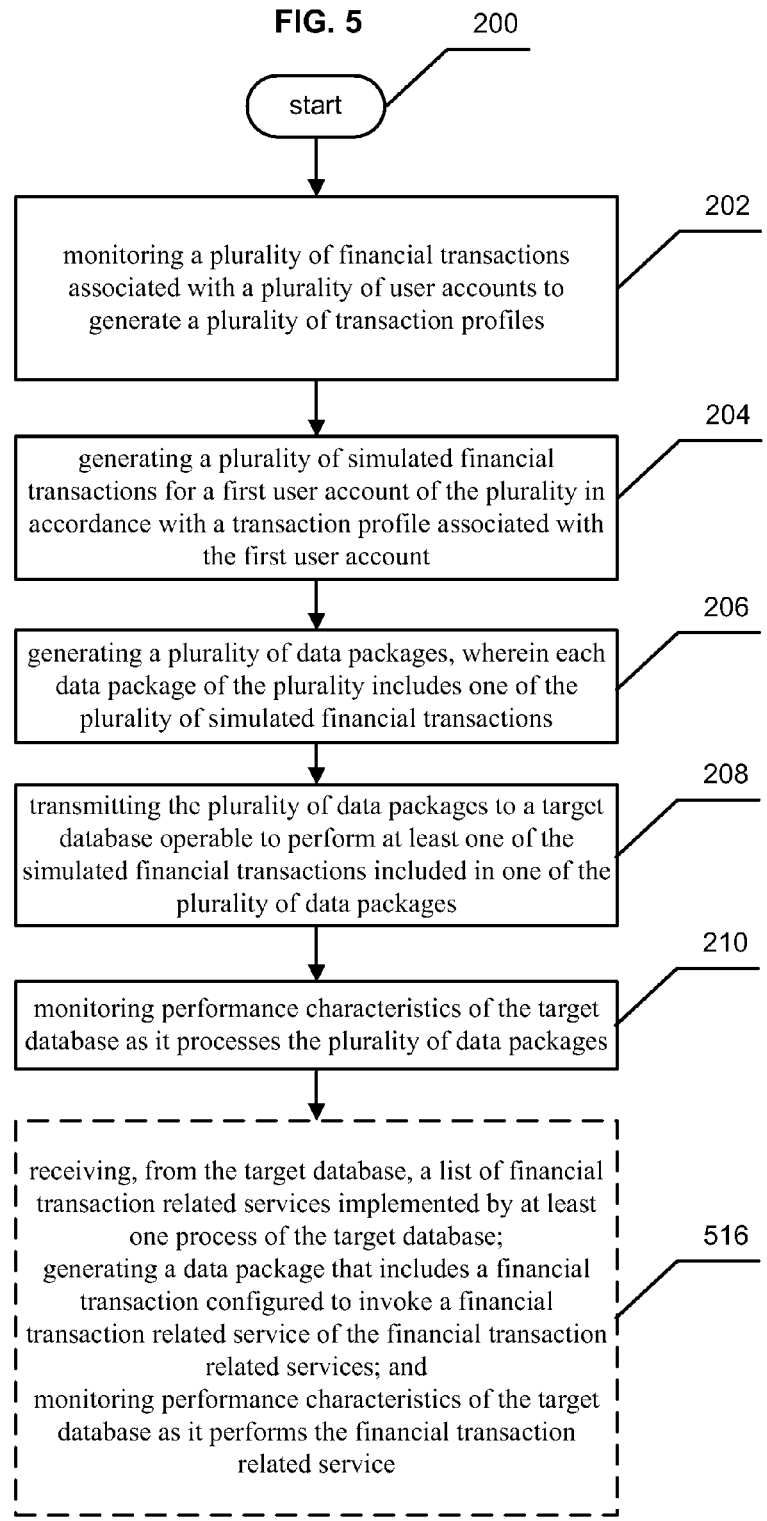
FIG. 5 depicts an alternative embodiment of the operational flowchart 200 of FIG. 2 including an additional operation.

Referring to FIG. 5, it depicts an alternative embodiment of the operational procedure 200 of FIG. 2 including an additional operation 516 that illustrates receiving, from the target database, a list of financial transaction related services implemented by at least one process of the target database; generating a data package that includes a financial transaction configured to invoke a financial transaction related service of the financial transaction related services; and monitoring performance characteristics of the target database as it performs the financial transaction related service. For example, in some embodiments of the present disclosure, the message service 126 can be configured to query the financial server 110 in order to obtain a list of services offered by the financial server 110. In response to the query, the financial server 110 can transmit one or more packets of information indicative of a list of the services it is capable of performing. In some instances, this list can include services like the currency exchange service 105, the authentication service. In other embodiments, the list of services can include other services that are offered to merchants or users, such as a service configured to allow users to transfer funds between a checking account and a saving account, electronic bill payment, downloadable bank statements, etc. Once a list is received, the message service 126 can access a database 140 that includes a set of rules that enables the message service 126 to generate messages that include transactions configured to invoke the processes configured to effect the services in the list. For example, if the list includes a service that allows users to transfer funds between a checking account and a savings account, the message service 126 can access the database to identify an schema that describes how messages of this type are formatted, and generate messages that direct the financial server 110 to transfer funds between accounts. The message generating service 134 can then identify an appropriate account stored in the database 102', in some embodiments in accordance with one or more transaction profiles, and generate one or more messages that transfer funds between a user's checking account and savings account. In this example embodiment, the monitoring service 124 can be configured to monitor the process configured to transfer the funds while the financial server is stressed 110 in order to determine whether the service is operating correctly.

Figure 6:
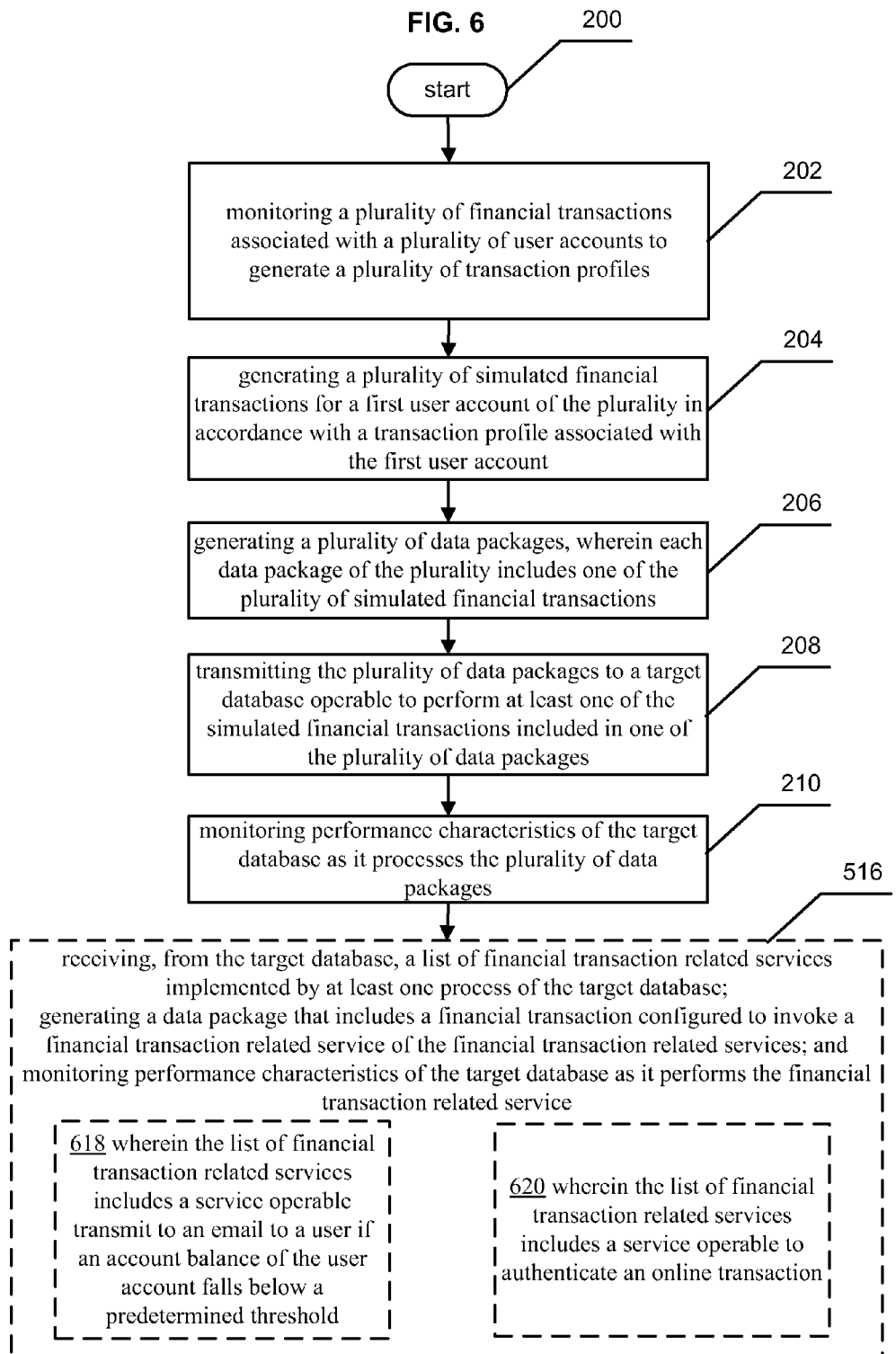
FIG. 6 depicts an alternative embodiment of the operational flowchart 200 of FIG. 5 including additional operations.

Referring to FIG. 6, it depicts an alternative embodiment of the operational procedure 200 of FIG. 5 to include operation 618, wherein the list of financial transaction related services includes a service operable transmit to an email to a user if an account balance of the user account falls below a predetermined threshold. For example, and in addition to the previous example, in some instances the list of transaction related services includes a service such as account notification service 106 that is configured to monitor the user accounts in database 102', and access a set of configuration files that indicates whether any users want emails sent to them under predetermined conditions. For example, a user can access a website that includes a list of available configuration settings. One of the settings can include an option to have the financial server 110 email the user if their account balance falls below a certain amount. In some instances, this amount could be set by the user, and in other embodiments it could be set by an administrator. The user can save the changes, and the setting could be written to configuration file(s) that includes a list of accounts that have enabled this feature. The account notification service 106 can be configured to access the file(s), and generate emails for the appropriate user if the account balance ever falls below the set threshold. Similar to that above, the message service 126 can be configured to generate one or more messages that include transactions operable to reduce the account balance for one, or a plurality, of user accounts below the threshold in order to monitor how the account monitoring service 150 operates while the server is stressed.

FIG. 6 additionally depicts another alternative embodiment including operation 620 wherein the list of financial transaction related services includes a service operable to authenticate an online transaction. For example, in some instances of the present disclosure, the list of transaction related services can include a service such as an online identity confirmation service 107 configured to verify, and authenticate a transaction by generating a questionnaire using personal background information of the user associated with the account. In this example, the online identity confirmation service 107 can be configured to monitor incoming messages to identify messages transmitted from online retailers requesting credit, or debit, authorization. In this example implementation, if a message arrives from such a retailer, and the online retailer has configured their website to challenge users trying to make purchase, the online identity confirmation service 107 can access a user profile, and generate one or more questions that can be transmitted back to the online retailer to be rendered on the user interface of the device the user is using. The identity confirmation service 107 can be configured to wait until it receives a correct answer before authenticating the transaction. Similar to that above, the message service 126 can be configured to generate one or more messages that include transactions simulating purchasing requests from websites operable to render challenges, and monitor how the online identity confirmation service 107 operates while the server is stressed.

Figure 7:
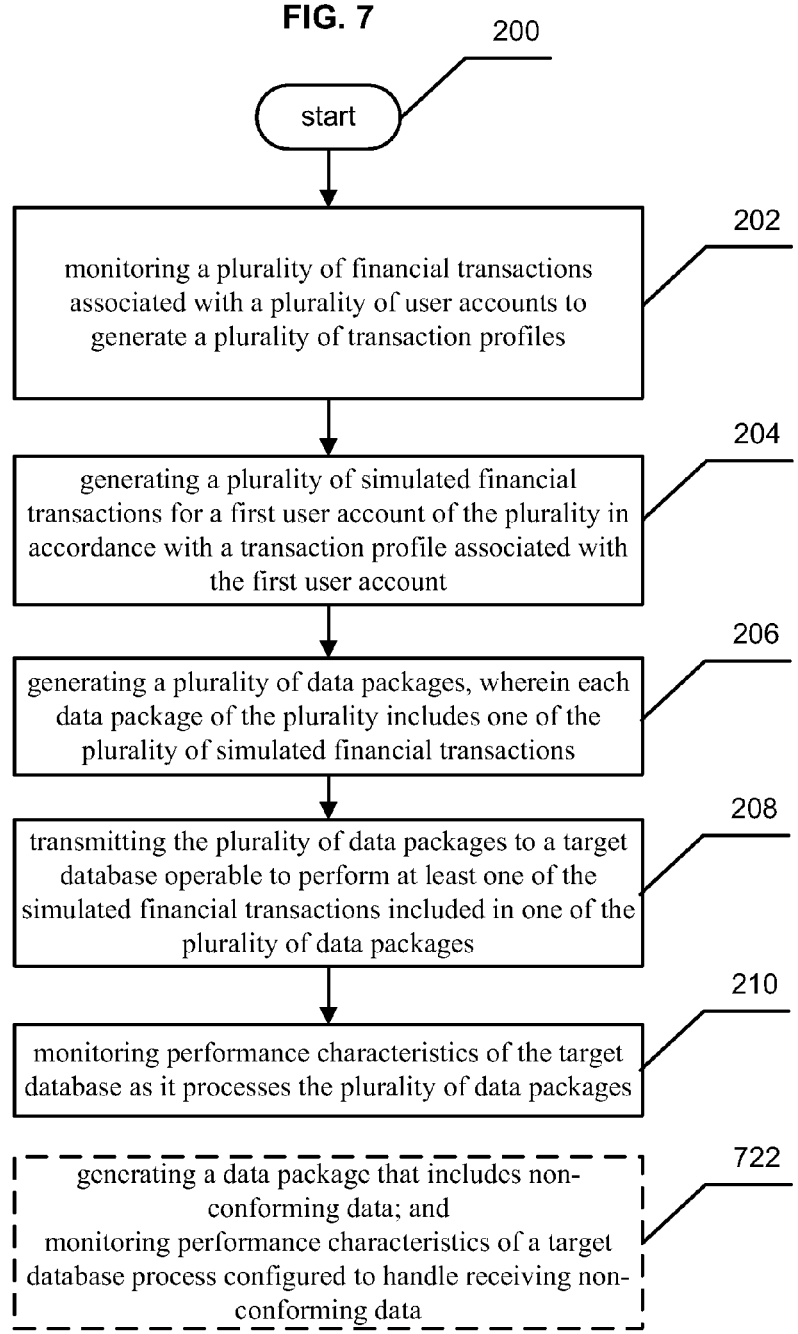
FIG. 7 depicts an alternative embodiment of the operational flowchart 200 of FIG. 2 including an additional operation.

Referring to FIG. 7, it depicts an alternative embodiment of the operational procedure 200 of FIG. 2 including an additional operation 722 that illustrates generating a data package that includes non-conforming data; and monitoring performance characteristics of a target database process configured to handle receiving non-conforming data. For example, in some embodiments of the present disclosure, the message service 126 can be configured to generate a message that includes non-conforming data to invoke a process configured to protect the financial server 110 from receiving, for example, gibberish. In some embodiments, an administrator of the system will want to perform negative testing on the financial server 110 to determine whether it can correctly handle messages that include data formatted incorrectly, nonsensical data formatted correctly, or nonsensical data formatted incorrectly. The financial server 110 can have one or more services such as policy enforcement service 108 configured to make sure all messages are appropriately formatted, and include appropriate data before allowing the financial services package 104' to perform an operation on an account. Accordingly, the message service 126 can be configured to randomly generate messages that can include valid data formatted incorrectly, nonsensical data formatted correctly, or nonsensical data formatted incorrectly in order to monitor how the policy enforcement service 108 handles the messages while the server is stressed.

Figure 8:
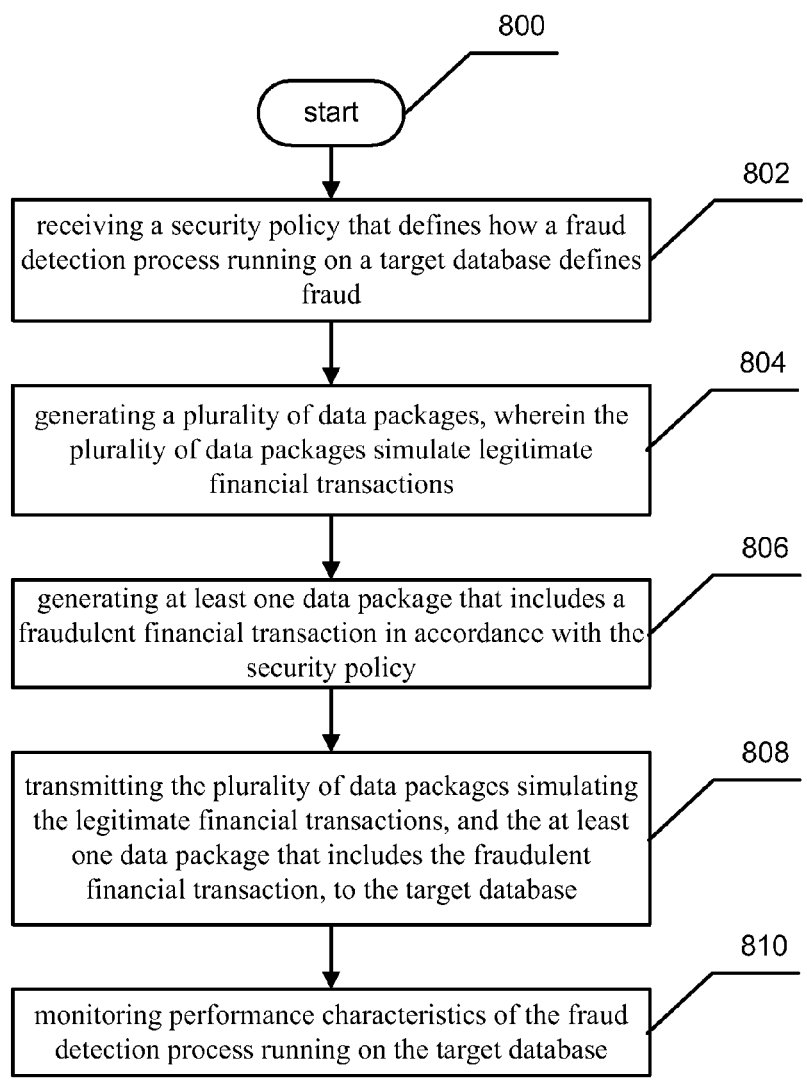
FIG. 8 depicts an example operational flowchart 800 that includes operations directed to stress testing a financial database.

Referring now to FIG. 8, it depicts an example operational flow chart depicting example operations related to stress testing a financial database that includes a plurality of operations including 800, 802, 804, 806, 808, 808, and 810. Operational procedure 800 begins the operational flow chart, and operation 802 illustrates receiving a security policy that defines how a fraud detection process running on a target database defines fraud. For example, in some embodiments of the present disclosure, a test system 120 can receive one or more electronic files that describe how a fraud detection process 109 running on a financial server 110 determines whether a transaction is fraudulent. For example, in some instances, a financial server 110 can include a sophisticated software service that can analyze messages received by the financial services software package 140', and flag the transactions in the messages as fraudulent by comparing the contents of the message to one or more rules. An example policy could be received from the financial server 110, or from an administrator, that identifies the rules that it will apply in determining whether a transaction is fraudulent. For example, in some embodiments the rules can include, but are not limited to, rules that flag transactions as fraudulent when, 3 or more withdrawal attempts within a certain time period, e.g., 5 minutes, multiple withdraw attempts occur that total over a certain amount within a certain time period, e.g., $1000.00 within 2 days, 2 or more ATM transactions occur at more than 2 ATMs within a certain time period, 5 or more transactions of any type occur within a short time period, a withdrawal exceeds 50% of the amount usually withdrawn by user, multiple purchase request occur from a place defined as high risk within a predetermined amount of time, e.g., gas station, total of returns exceed purchases within a certain time period, etc.

Continuing with the example operational procedure, operation 804 shows generating a plurality of data packages, wherein the plurality of data packages simulate legitimate financial transactions. For example and in addition to the previous example, a message generating service 134 of a message service 126 can be configured in some embodiments to generate one or more data packages indicative of messages that include simulated legitimate financial transactions. In some instances, an administrator can create a plurality of electronic files, and store them in a database 140. The electronic files can include a plurality of transactions for a plurality of user accounts stored in a database 102'. The files can be designed such that the message generating service 134 can read the files and create the data packages.

Continuing with the description of the example operational procedure 800 of FIG. 8, operation 806 shows generating at least one data package that includes a fraudulent financial transaction in accordance with the security policy. For example, and in addition to the previous example, in some implementations the message generating service 134 can be configured to generate a data package that includes a message that the fraud detection process 109 would consider fraudulent. The message generating service 134 can access the security policy that outlines how the fraud detection process 109 defines fraud, and use this information to specifically create a message that would be flagged as fraudulent. For instance, if the fraud detection process 109 of the financial server 110 considers that 2 or more ATM transactions occurring at more than 2 ATMs within a certain time period is indicative of fraudulent activity, the message generating service 134 could create two messages that include ATM transactions from different ATMs for the same account less than 5 minutes apart.

Continuing with the description of the example operational procedure 800 of FIG. 8, operation 808 shows transmitting the plurality of data packages simulating the legitimate financial transactions, and the at least one data package that includes the fraudulent financial transaction, to the target database. For example, and in addition to the previous example, once a plurality of data packages indicative of messages that include simulated legitimate activity and fraudulent activity have been generated by the message generating service 134, the terminal 122 can transmit the plurality of data packages to a target database such as the financial server 110.

Continuing with the description of the example operational procedure 800 of FIG. 8, operation 810 shows monitoring performance characteristics of the fraud detection process running on the target database. For example, and in addition to the previous example, a monitoring service 124 can be coupled to the financial server 110, and record data indicative how the fraud detection process 109 is running on the financial server 110. For example, in some embodiments of the present disclosure, the monitoring service 124 can monitor different metrics such as input/output and transfer rate statistics, processing statistics, i.e., per CPU, per thread, etc., memory utilization statistics, virtual memory, paging and fault statistics, interrupt statistics, file system activity, context switching statistics, network statistics, etc. In this example embodiment, the monitoring service 124 can be configured to monitor one or more threads of the fraud detection process 109 in order to determine whether the threads are hanging, whether they are receiving enough processor time, whether they have access to enough memory, whether they are stable, etc. In this example embodiment, the monitoring service 124 can provide an administrator with information about whether the fraud detection process 109 is operating correctly, and/or whether the process is receiving enough resources that it will be able to detect fraudulent behavior when the system is stressed.

Referring now to FIG. 9, it depicts an alternative embodiment of the operational procedure 800 of FIG. 8 including an additional operation 912 that illustrates monitoring a plurality of financial transactions associated with a plurality of user accounts to generate a plurality of transaction profiles; and generating a plurality of legitimate financial transactions in accordance with the plurality of transaction profiles. For example, in at least one example embodiment, a data mining algorithm 130 of a message service 126 can be configured to record a plurality of financial transactions in a transaction log 132, and use the information in a transaction log 132, and use the data to generate the plurality of simulated legitimate financial transactions. In at least one embodiment, the transaction log 132 could include, for example, a weeks worth of transaction data all the purchases, withdrawals, deposits, refunds, reversals, balance inquires, payments, and/or an inter-account transfers that occurred. The data mining algorithm 132 can process the information, determine how likely certain transaction will be performed on the accounts, and the message generating service 134 can use any discovered pattern to generate the plurality of simulated legitimate financial transactions.

Referring now to FIG. 10, it depicts an alternative embodiment of the operational procedure 800 of FIG. 8 including an additional operation 1014 that illustrates monitoring performance characteristics of the target database as it processes the plurality of data packages; determining that the performance characteristics of the target database indicate that the target server is stressed; and transmitting a data package that includes the fraudulent financial transaction while the target server is stressed. For example, in some embodiments of the present disclosure, the monitoring service 124 can be configured to flag test environments that include metrics indicative of a stressed environment. For example, the monitoring service 124 can include one or more processes that monitor the metrics, and one or more threshold values. In some embodiments of the present disclosure, an administrator experienced with operating environments such as banking system 100 can configure values for the thresholds, or in other embodiments, a base line reading of the financial server's metrics can be obtained, and used by the monitoring service 124 to generate the thresholds. In this example embodiment, the message generating service 134, could be configured to interface with the monitoring service 124 to receive a signal that indicates that the server is in a stressed state. In this example embodiment, the message generating service 134 can queue up one or more messages that include transactions that would be indicative of fraudulent behavior according to the security policy of the fraud detection process 109, and transmit the packages in order to monitor how the fraud detection process 109 handles the fraudulent messages while in a stressed state.

Referring now to FIG. 11, it depicts an alternative embodiment of the operational procedure 800 of FIG. 10 including an additional operation 1116 that illustrates operation 1014 wherein monitoring performance characteristics of the fraud detection process includes determining whether the fraud detection process detected the data package that includes the fraudulent financial transaction. For example, an in addition to the previous example, in one or more example embodiments the monitoring service 124 can be configured to determine whether the fraud detection process 109 successfully identifies a message that included a fraudulent message according to the security policy. In this example, the terminals 122 can be configured to send off messages including fraudulent transactions, at a slow rate in order to obtain a base line reading as to what percentage of fraudulent messages were intercepted. After the baseline is obtained, the terminals can increase the rate at which messages are sent to the financial server 110, and the monitoring service 124 can keep track of whether the fraud detection process 109 was able to detect a similar percentage of fraudulent messages as the stress on the server increased.

Referring now to FIG. 12, it depicts an alternative embodiment of the operational procedure 800 of FIG. 11 including an additional operation 1216 that illustrates operation 1014 wherein monitoring performance characteristics of the fraud detection process includes determining whether the fraud detection process performed an action in response to detecting the data package that includes the fraudulent financial transaction. For example, in some embodiments of the present disclosure the fraud detection process 109 can have one or more sub-processes configured to carry out actions associated with the rules that define fraud. For example, each rule can be associated with one or more triggers that direct a sub-process of the fraud diction process 109 to perform an action when it encounters a fraudulent message. In some embodiments this can include emailing a cardholder that a fraudulent transaction was intercepted, disabling the account, disabling the card associated with the transaction, notifying the POS terminal, or an administrator of an ATM that this transaction was considered fraudulent, etc. In this example embodiment, the monitoring service 124 can be configured to determine whether one or more of the sub-processes configured to perform actions associated with identifying fraudulent messages successfully performed an action. Similar to that described above, a base line reading as to what percentage of fraudulent messages were intercepted and what percentage of successful actions taken by sub-processes can be recorded. After the baseline is obtained, the terminals can increase the rate that messages are sent to the financial server 110, and the monitoring service 124 can keep track of whether the sub-processes attempting to perform actions in response to receiving fraudulent messages can be tracked and compared to the baseline reading as the stress of the server increased.

Referring now to FIG. 13, it depicts an alternative embodiment of the operational procedure 800 of FIG. 8 including an additional operation 1318 that shows generating one or more data packages indicative of an attack on the target server; and monitoring performance characteristics of a process configured to handle the attacks on the target server. For example, in some embodiments of the present disclosure, database 140 can include one or more schemas that enable the message generation service 132 to generate one or more data packages that simulate an attack on the financial server 110, and the monitoring service 124 can be configured to monitor how a processes configured to protect the server is able to handle the attack. For example, the schemas stored in database 140 can describe how to generate a denial of service attack, e.g., an attempt to attack the financial server in order to make it unavailable for legitimate traffic. In this example, one or more processes such as server protection service 161 can be configured to protect the server 110, monitor the messages as they are received, and attempt to block messages that are identified as messages that can affect the financial server 110.

Referring now to FIG. 14, it depicts an alternative embodiment of the operational procedure 800 of FIG. 8 including an additional operation 1420 that shows accessing a banking database that includes a plurality of user accounts; and copying the plurality of user accounts into the target database. For example, and similar to that describe above, in some example implementations of the present disclosure, a snapshot of the database 102 of the banking system 100 can be taken by the data mining algorithm 132 of the test system. The snapshot can include the account information, and configuration settings for one or more of the services that are implemented by the banking system 100. The data mining algorithm 132 can then transfer the obtained data over to database 102' such that database 102' is a copy of database 102.

The foregoing detailed description has set forth various embodiments of the systems and/or methods via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A system for stress testing a financial database comprising:
   at least one subsystem stored in memory on one or more computer processors configured to receive a security protocol comprising data that describes how a fraud detection process running on a target database defines fraud;
   at least one subsystem stored in memory on one or more computer processors configured to generate a plurality of data packages, wherein the plurality of data packages simulate legitimate financial transactions;
   at least one subsystem stored in memory on one or more computer processors configured to generate at least one data package that includes a fraudulent financial transaction in accordance with the security policy;
   at least one subsystem stored in memory on one or more computer processors configured to transmit the plurality of data packages simulating the legitimate financial transactions, and the at least one data package that includes the fraudulent financial transaction, to the target database; and
   at least one subsystem stored in memory on one or more computer processors configured to monitor performance characteristics of the fraud detection process running on the target database.

2. The system of claim 1, further comprising:
   at least one subsystem configured to generate a plurality of legitimate financial transactions in accordance with the plurality of transaction profiles.

3. The system of claim 1, further comprising:
   at least one subsystem configured to monitor performance characteristics of the target database as it processes the plurality of data packages;
   at least one subsystem configured to determine that the performance characteristics of the target database indicate that the target server is stressed; and
   at least one subsystem configured to transmit a data package that includes the fraudulent financial transaction while the target server is stressed.

4. The system of claim 3, wherein monitoring performance characteristics of the fraud detection process includes determining whether the fraud detection process detected the data package that includes the fraudulent financial transaction.

5. The system of claim 4, wherein monitoring performance characteristics of the fraud detection process includes determining whether the fraud detection process performed an action in response to detecting the data package that includes the fraudulent financial transaction.

6. The system of claim 1, further comprising:
   at least one subsystem configured to generate one or more data packages indicative of an attack on the target server; and
   at least one subsystem configured to monitor performance characteristics of a process configured to handle the attacks on the target server.

7. The system of claim 1, further comprising:
   at least one subsystem configured to access a banking database that includes a plurality of user accounts; and
   at least one subsystem configured to copy the plurality of user accounts into the target database.

8. A method for stress testing a financial database implemented on one or more computer processors comprising:
   receiving a security protocol comprising data that describes how a fraud detection process running on a target database defines fraud;
   generating on one or more computer processors a plurality of data packages, wherein the plurality of data packages simulate legitimate financial transactions;
   generating on one or more computer processors at least one data package that includes a fraudulent financial transaction in accordance with the security protocol;
   transmitting from one or more computer processors the plurality of data packages simulating the legitimate financial transactions, and the at least one data package that includes the fraudulent financial transaction, to the target database;
   monitoring a plurality of financial transactions associated with a plurality of user accounts to generate a plurality of transaction profiles;
   accessing a banking database that includes the plurality of user accounts and copying the plurality of user accounts into the target database; and monitoring on one or more computer processors performance characteristics of the fraud detection process running on the target database.

9. The method of claim 8, further comprising:
generating a plurality of legitimate financial transactions in accordance with the plurality of transaction profiles.

10. The system of claim 8, further comprising:
monitoring performance characteristics of the target database as it processes the plurality of data packages;
determining that the performance characteristics of the target database indicate that the target server is stressed; and
transmitting a data package that includes the fraudulent financial transaction while the target server is stressed.

11. The method of claim 10, wherein monitoring performance characteristics of the fraud detection process includes determining whether the fraud detection process detected the data package that includes the fraudulent financial transaction.

12. The method of claim 11, wherein monitoring performance characteristics of the fraud detection process includes determining whether the fraud detection process performed an action in response to detecting the data package that includes the fraudulent financial transaction.

13. The method of claim 8, further comprising:
generating one or more data packages indicative of an attack on the target server; and
monitoring performance characteristics of a process configured to handle the attacks on the target server.

14. The method of claim 8, further comprising:
accessing a banking database that includes a plurality of user accounts; and
copying the plurality of user accounts into the target database.

15. A computer-readable storage medium including computer-readable instructions for stress testing a financial database that includes a plurality of processes, comprising:
instructions for receiving a security protocol comprising data that describes how a fraud detection process running on a target database defines fraud;
instructions for generating a plurality of data packages, wherein the plurality of data packages simulate legitimate financial transactions;
instructions for generating at least one data package that includes a fraudulent financial transaction in accordance with the security protocol;
instructions for transmitting the plurality of data packages simulating the legitimate financial transactions, and the at least one data package that includes the fraudulent financial transaction, to the target database;
instructions for monitoring a plurality of financial transactions associated with a plurality of user accounts to generate a plurality of transaction profiles;
instructions for accessing a banking database that includes the plurality of user accounts and copying the plurality of user accounts into the target database; and
instructions for monitoring performance characteristics of the fraud detection process running on the target database.

16. The computer-readable storage medium of claim 15, further comprising:
instructions for generating a plurality of legitimate financial transactions in accordance with the plurality of transaction profiles.

17. The computer-readable storage medium of claim 15, further comprising:
instructions for monitoring performance characteristics of the target database as it processes the plurality of data packages;
instructions for determining that the performance characteristics of the target database indicate that the target server is stressed; and
instructions for transmitting a data package that includes the fraudulent financial transaction while the target server is stressed.

18. The computer-readable storage medium of claim 17, wherein monitoring performance characteristics of the fraud detection process includes determining whether the fraud detection process detected the data package that includes the fraudulent financial transaction.

19. The computer-readable storage medium of claim 18, wherein monitoring performance characteristics of the fraud detection process includes determining whether the fraud detection process performed an action in response to detecting the data package that includes the fraudulent financial transaction.

20. The computer-readable storage medium of claim 15, further comprising:
instructions for generating one or more data packages indicative of an attack on the target server; and
instructions for monitoring performance characteristics of a process configured to handle the attacks on the target server.

21. The computer-readable storage medium of claim 15, further comprising:
instructions for accessing a banking database that includes a plurality of user accounts; and
instructions for copying the plurality of user accounts into the target database.

\* \* \* \* \*